United States Patent [19]

Wold et al.

[11] Patent Number: 5,386,568

[45] Date of Patent: Jan. 31, 1995

[54] APPARATUS AND METHOD FOR LINKING SOFTWARE MODULES

[75] Inventors: Erling Wold, El Cerrito; Thomas L. Blum, San Francisco, both of Calif.

[73] Assignee: Yamaha Corporation, Hamamatsu, Japan

[21] Appl. No.: 984,862

[22] Filed: Dec. 1, 1992

[51] Int. Cl.$^6$ ............................................. G06F 13/00
[52] U.S. Cl. .................... 395/700; 364/221.9; 364/242.5; 364/260; 364/260.2; 364/284; 364/284.3; 364/DIG. 1
[58] Field of Search ................. 395/700; 364/DIG. 1, 364/DIG. 2

[56] References Cited

U.S. PATENT DOCUMENTS 4,630,196 12/1986 Bednar, Jr. et al. .
5,133,053 7/1992 Johnson et al. .
5,212,792 5/1993 Gerety et al. ................... 395/650
5,257,369 10/1993 Skeen et al. .
5,261,080 11/1993 Khoyi et al. .

OTHER PUBLICATIONS

Lentczner, M. "Sound Kit A Sound Manipulator," proceedings of the International Computer Music Conference, 1985, pp. 141–144.
Puckett, M. "The Patcher," proceedings of the International Computer Music Conference, 1988, pp. 420–429.

*Primary Examiner*—Kevin A. Kriess
*Assistant Examiner*—J. H. Backenstose
*Attorney, Agent, or Firm*—Graham & James

[57] ABSTRACT

An apparatus and method for interconnecting a plurality of independent software modules by means of specially configured software objects called "Input" and "Output". The software objects are implemented through library functions which include functions for making an Output object, making an Input object, adding actions to Input objects, making connections between the Input and Output objects of various software modules, sending messages from one software module to another, and receiving messages sent by another software module. The invention also provides a system for interconnecting a plurality of hardware modules, each of which may employ different internal data formats. Additionally, a novel graphical user interface is provided, whereby a user can create, destroy, inspect and/or hide connections between software modules, as well as display data flow between modules.

20 Claims, 12 Drawing Sheets

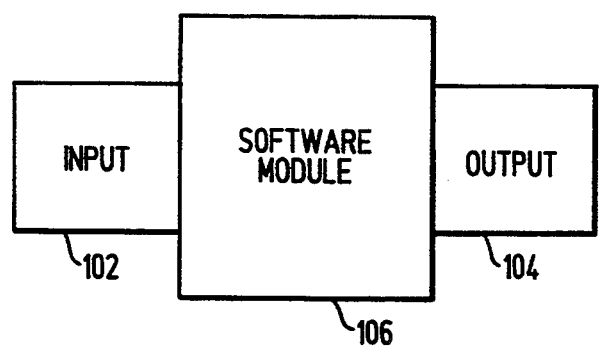
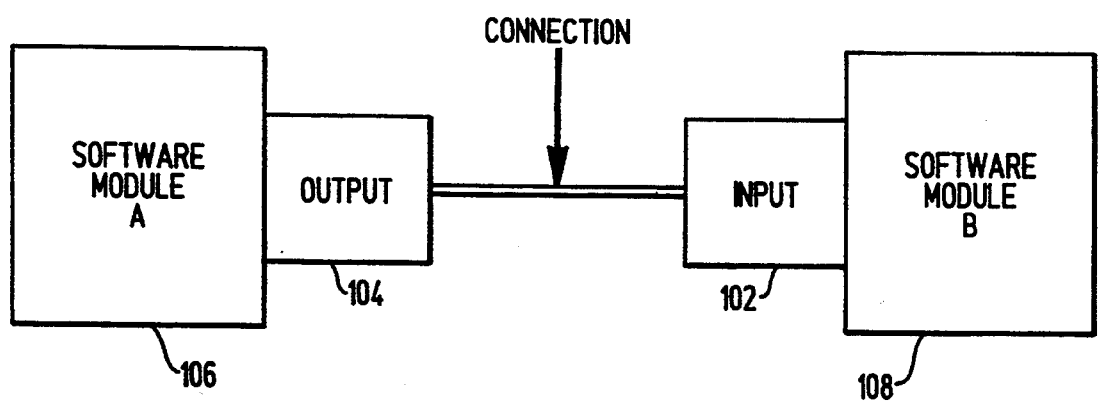
FIG. 1

| TABLE OF INPUTS | |
|---|---|
| OUTPUT NUMBER | INPUT OBJECT NAME |
| 1 | INPUT ADDRESS #5 |
| 1 | INPUT ADDRESS #8 |
| 1 | INPUT ADDRESS #19 |
| 2 | INPUT ADDRESS #32 |
| 2 | INPUT ADDRESS #2 |
| ⋮ | ⋮ |
| 39 | INPUT ADDRESS #19 |
| 39 | |
| 40 | INPUT ADDRESS #33 |
| 40 | INPUT ADDRESS #27 |
| 40 | INPUT ADDRESS #3 |

FIG. 5

| MESSAGE REGISTERS |||
| --- | --- | --- |
| REG # | MESSAGE VALUE | DATA TYPE |
| REG #1 | 440 | FLOATING POINT |
| REG #2 | "ERROR #105" | CHARACTER |
| REG #3 | 60 | FLOATING POINT |
| ⋮ | ⋮ | ⋮ |
| REG #59 | 150 | INTEGER |
| REG #60 | 1000 | FLOATING POINT |

FIG. 6a

TABLE OF ACTIONS

| INPUT OBJECT NUMBER | DATA TYPE | ACTION |
|---|---|---|
| 1 | FLOATING POINT | SQUARE ROOT |
| 1 | INTEGER | SQUARE |
| 1 | HEXADECIMAL | SUBTRACT ONE |
| 2 | FLOATING POINT | SQUARE |
| 2 | INTEGER | NATURAL LOG |
| 2 | ASCII CODE | DISPLAY |
| 3 | 32 - BIT WORD | FAST FOURIER TRANSFORM |
| 3 | 16 - BIT WORD | $SIN^2 X$ |
| 3 | INTEGER | $1/TAN^2 X-1$ |
| 4 | FLOATING POINT | ARCTAN X |
| ⋮ | ⋮ | ⋮ |
| 40 | HEXADECIMAL | ADD ONE |

FIG. 6b

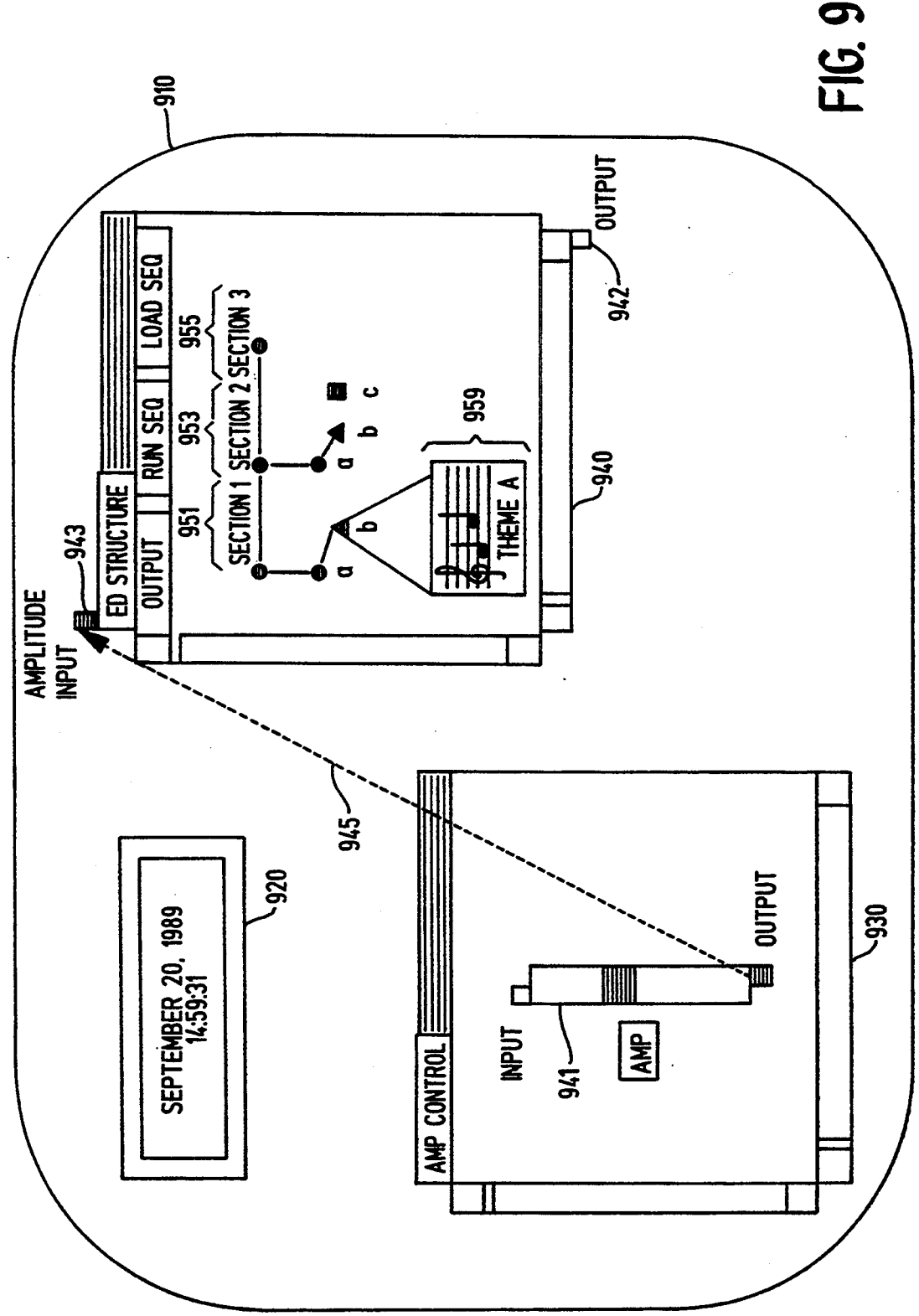

APPARATUS AND METHOD FOR LINKING SOFTWARE MODULES

BACKGROUND OF THE INVENTION

1. Field of the Invention

This invention relates generally to computer software, and more specifically to an apparatus and method for interconnecting a plurality of independent software modules.

2. Description of Related Art

Various architectures are well-known for linking together software modules (the term "software module", as used herein, is defined as including objects, functions, routines, procedures, and/or applications). Some of these architectures may be utilized to implement a system for computer-aided musical composition. For example, a number of languages exist which are adapted to musical composition, such as Csound. These languages generally specify particular software modules, along with a list of connections. Graphical programming languages also exist which provide a user with a mechanism for graphically connecting the inputs and outputs of software modules. In the musical field, examples of graphical programming languages are TurboSynth, Patcher, Xmusic, and MAX. For further information on related art in the field of computer-aided musical composition, the following references may be consulted:

(1) Lentczner, M. "Sound Kit—A Sound Manipulator," Proceedings of the 1985 International Computer Music Conference, pp. 141–149, published by Computer Music Association, San Francisco, Calif. 1985; and (2) Puckett, M. "The Patcher," Proceedings of the 1988 International Computer Music Conference, pp. 420–429, published by Computer Music Association, San Francisco, Calif., 1988.

A major disadvantage of all known prior-art music control software architectures is that they do not allow universal connections between software modules on different machines. Additionally, no prior-art system allows arbitrary "fan-in" (the number of allowable input connections) and "fan-out" (the number of allowable output connections), nor do any of these prior-art systems permit the use of hardware configurations which provide for flexible, adaptable connections between a plurality of individual hardware modules.

Communication between software modules is generally necessary in large systems, such as a system which may be employed to assist in the composition of music. However, the process of communication among a plurality of software modules is often implemented in an inconsistent way. Past approaches have not allowed interacting software modules to reside on different machines, such as on computers, synthesizers, mixers, processors, lighting controllers, etc., even though such a system would greatly facilitate the process of computer-aided musical composition.

It would be desirable to provide a technique for interconnecting a plurality of software modules which provides the following features:

(1) enhanced communication within a single software application;

(2) enhanced communication between different software applications;

(3) application programs which are capable of running across a network of machines;

(4) enhanced communication between hardware devices; and (5) enhanced applications and devices which provide a high level of software and hardware interaction.

End-users would have a special incentive to use technology which provides the features set forth above, because all hardware and software products would provide complete compatibility from the standpoint of the end-user.

As applied to computer-aided musical composition, the aforementioned features would provide several practical advantages. Many music studios have a large number of electronic and electro-acoustic devices connected together. The studio of the future will require closer integration of these devices. It would be highly desirable to connect all such devices together to form one large network. Consequently, software residing on one network device should be capable of interfacing with the software on other network devices. No currently existing method of software module interconnection provides such a complete level of device integration. However, the present invention meets the aforementioned objectives.

SUMMARY OF THE INVENTION

The invention provides an improved method for interconnecting a plurality of independent software modules by means of specially configured software objects called "Input" and "Output". The invention also provides a system for interconnecting a plurality of hardware modules, each of which may employ different internal data formats. Additionally, a novel graphical user interface is provided, whereby a user can create, destroy, inspect and/or hide connections between software modules, as well as display data flow between modules.

The method of the present invention is implemented by identifying the logical inputs and outputs for each software module to be connected to any other software module. For each such input or output, a programmer would preferably call a corresponding "Make an Input" function or "Make an Output" function. These objects generate, or define locations for, the necessary information to link a logical input to a logical output. In particular, each input is categorized according to data type, such as floating-point number, integer, binary, ASCII characters, etc. Next, a corresponding Input or Output object for the software module is created for each of the logical inputs and outputs. An Output object is initially created as a blank table for input names or addresses, and, preferably, a data type register. The Output data structure, or its memory address, is returned as a newly-created Output object. An Input object is created by preparing a table of actions and a message register. The table of actions and the message register are grouped into a newly-created Input data structure. The Input data structure, or its memory address, is returned as a newly-created Input object.

Actions are added to an Input object by calling an "Add an Action" function, and specifying an Input object name or address, the data type for which action is taken, and the name or address of a routine that defines the action to be taken. The data type and the action are paired together and placed into the table of actions in the appropriate Input object.

After all Input and Output objects are created, connections can be established between various software modules by calling a "Make a Connection" function, and specifying the Input object and Output object to be connected. After the Input and Output names or addresses are specified, the data type of the Input object and Output object are compared. If a match exists, the Input object name or address is added to the table of inputs in the specified Output object.

After connections are made between Input and Output objects, data transfers between Inputs and Outputs may be implemented by calling a "Send a Message" function, and specifying the Output object which will transmit the message and the message itself. The "Send a Message" function passes a copy of the message to each Input object listed in the table of inputs of the specified Output object. A "Receive a Message" function is then automatically invoked to access each such Input object and determine if the data type of the message has at least one matching data type in the table of actions of the Input object. If a match exists, the action associated with that data type in the table of actions is executed. In addition, the message is transferred into the message register of the Input object.

In a preferred embodiment of the invention, the software operations are implemented as library functions. The library functions may include functions for making an Output object, making an Input object, adding actions to Input objects, making connections between the Input and Output objects of various software modules, sending messages from one software module to another, and receiving messages sent by another software module.

An alternative embodiment of the invention provides a graphical user interface (GUI) which depicts each Input and Output object of various software modules as a graphical symbol or icon, The GUI allows an end-user to call the "Make a Connection" library function. For example, a standard computer mouse can be used to make connections between a plurality of graphical icons representing the different Input and Output objects of the various software modules. Clicking the mouse on the desired icons will call the "Make a Connection" library function with the appropriate Inputs and Outputs as parameters.

The invention thus provides a novel graphical user interface which permits the user to create, destroy, or hide connections between software modules. The interface offers the capability of crossing window boundaries when connecting logical inputs to logical outputs. The interface also preferably depicts data transfers over each connection in a graphical manner, enabling a user to distinguish between active and idle connections. Finally, the graphical interface allows a user to extensively inspect a connection to examine the input parameters, the output parameters, and the rate, volume, and type of data traversing the connection.

The details of the preferred embodiment of the present invention are set forth in the accompanying drawings and the description below. Once the details of the invention are known, numerous additional innovations and changes will become obvious to one skilled in the art.

DESCRIPTION OF THE DRAWINGS

FIG. 1 is a block diagram illustrating the operational environment of the present invention, which includes software modules, inputs, outputs, and connections.

FIG. 5 is a table setting forth the preferred data structures for the table of inputs for an Output object of the present invention.

FIG. 6a is a is a table setting forth the preferred data structure for the message register for an Input object of the present invention.

FIG. 6b is a table setting forth the preferred data structure for the table of actions for an Input object of the present invention.

FIG. 9 is a pictorial representation of a computer display screen showing a preferred embodiment of the graphical interface of the present invention which is capable of simultaneously displaying activity in a plurality of individual windows.

FIG. 10b is a diagram of a computer screen from FIG. 10a.

Like numbers and designations in the drawings refer to like elements.

DETAILED DESCRIPTION OF THE INVENTION

Figure 2:
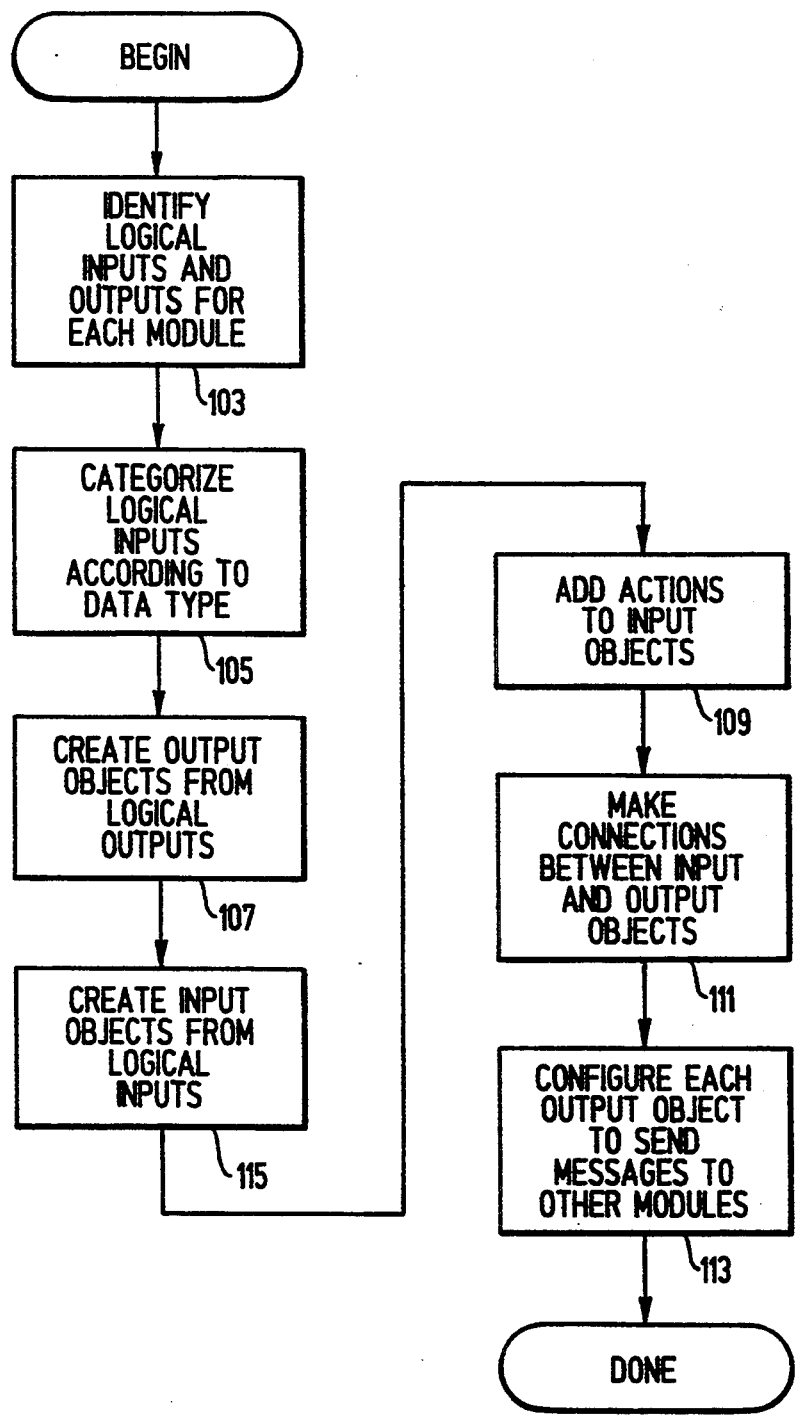
FIG. 2 is a high-level flowchart illustrating the overall procedure for interconnecting a plurality of independent software modules according to the method of the present invention.

Throughout this description, the preferred embodiment and examples shown should be considered as exemplars, rather than as limitations on the present invention. For example, although the invention is described in the context of software for the generation of musical compositions, the invention could be used to develop software and firmware products for a variety of purposes and end uses.

This invention provides a uniform method of connecting software modules. The invention also makes it easier to interconnect hardware modules which have different internal data formats. A software module may be defined as including objects, functions, routines, procedures, and/or applications. These interconnections can be made within a single application or between applications. The invention is adapted to interconnect software modules even if such modules are part of applications running on different machines connected via a computer network or signal linkage.

The invention provides a technique which enables communication between inputs and outputs of all software modules of all types. Software modules can be connected and disconnected easily from outside the modules. That is, no internal changes have to be made to the software modules. This invention is an improvement over existing software module interconnection techniques which typically connect software modules in an unstructured way within an application. Accordingly, in prior art systems, it is often difficult or impossible to make connections between different applications. Even if connections are available, the channels of communication are usually simple and unstructured.

Overview of the Invention

With reference to FIG. 1, the invention utilizes two types of software objects, called Input 102 and Output 104. These objects implement interconnections between a plurality of software modules 106, 108. Each software module 106, 108 may have a plurality of Input objects 102 and Output objects 104. To the end-user, each Input object 102 and Output object 104 represents a corresponding logical input or output of a particular software module 106, 108. The invention is adapted to run on a general-purpose processor. Such a processor may be inside a general-purpose computer, but it can also be inside an electronic device such as a music synthesizer, mixing console, lighting controller, or other music generation and control component. The invention is user-transparent, in that it hides the details of communication from programmers and users of interconnected software systems.

In writing software modules 106, 108, a programmer uses one Input object 102 for each logical input, and one Output object 104 for each logical output, of the corresponding software module 106, 108. The logical inputs and outputs are used to produce corresponding Input objects 102 and Output objects 104. For example, consider a software module 106, which takes as input a number and produces the square of the number. This module 106 has one logical input—the original number——and one logical output—the square of the number. The logical inputs and outputs are processed by the method of the present invention using a library of software functions to create corresponding Input objects 102 and Output objects 104. The objects are linked to the programmer's software modules to make these objects part of each software module 106.

FIG. 2 is a flowchart which provides a high-level description and a general overview of the method of the present invention. The steps set forth in FIG. 2 are described in much greater detail in FIGS. 3 and 4.

With reference to FIG. 2, the method of the present invention is implemented by identifying the logical inputs and outputs for each software module (block 103). At block 105, the inputs are categorized according to data type, such as floating-point number, integer, binary, ASCII characters, etc. Next, the logical inputs and outputs are used to create corresponding Input and Output objects for each software module (blocks 107 and 115). Actions may be added to the Inputs as desired (block 109). The Input objects and Output objects are then linked together as desired (block 111). The Output objects are then configured to transfer data to other modules in a form that will be recognizable by any connected Input objects (block 113).

General Implementation of Invention

Figure 3:
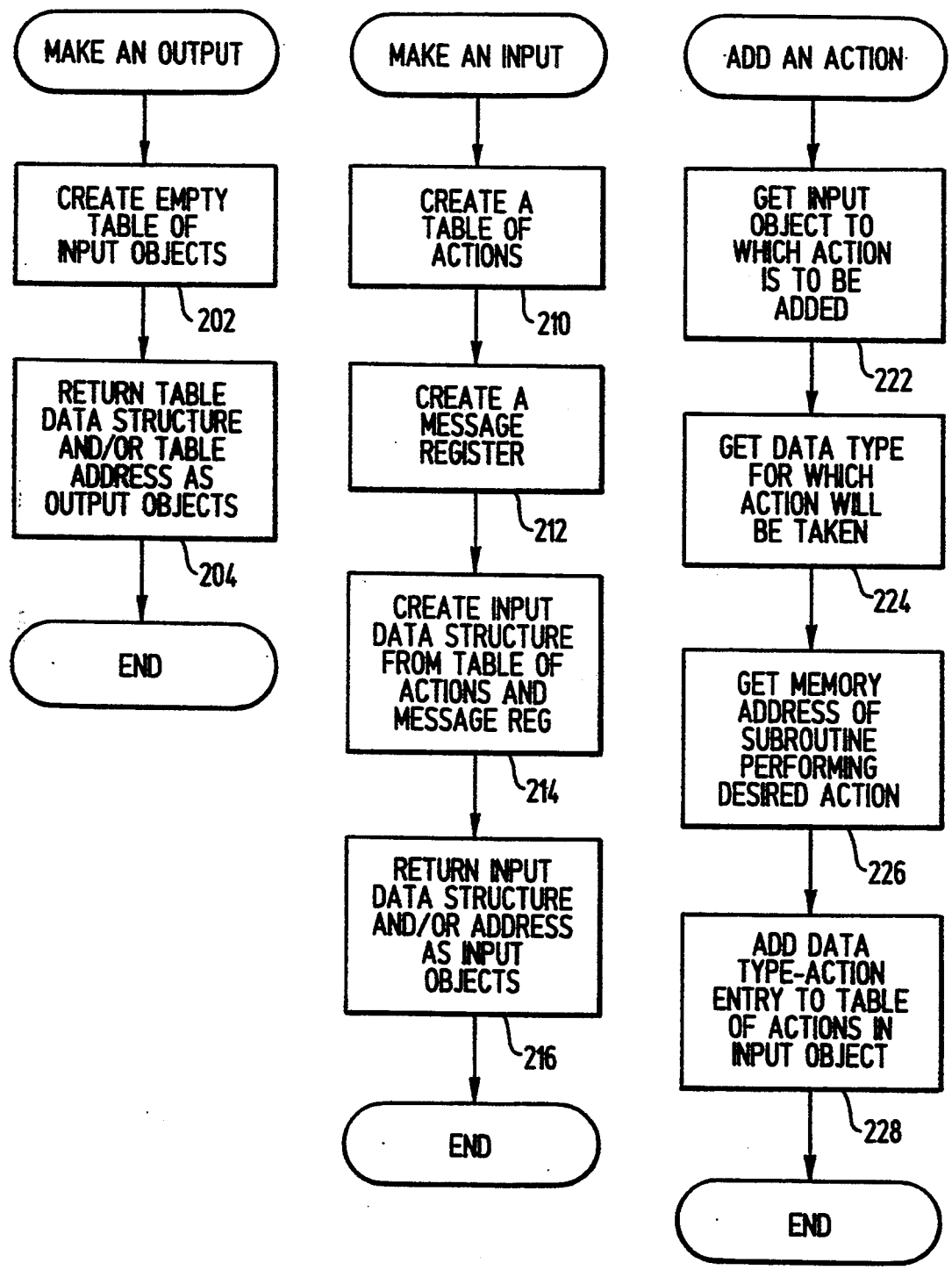
FIG. 3 is a high-level flowchart illustrating the preferred procedure for making the Inputs and Outputs shown in FIG. 2, and setting forth the steps for adding an action to an Input.

The steps of creating Input and Output objects and adding an action to Input objects are described more fully in FIG. 3. To create an Output object 104, a library function called "Make an Output" is called by the programmer. This function creates a table of inputs, which is initially empty (block 202), and preferably, a data type register set with the data type for this Output object 104 (block 204). Entries pointing to Input objects 102 will be made in the table after connections between the Output object 104 and one or more Input objects 102 are made. The table of inputs and the data type register are grouped together into one data structure comprising the newly-created Output object 104. The "Make an Output" function returns this compound data structure or its memory address (or other direct or indirect pointer) as the newly-created Output object 104. The data structure of the table is shown in FIG. 5, and is described in greater detail below. In the preferred embodiment, the "Make an Output" function may be called using a command structure as follows:

MakeOutput (output object name, data type)

To create an Input object 102, a library function called "Make an Input" is called by the programmer. This function creates a table of actions (block 210) and a message register (block 212). The table of actions associates a specific action with a corresponding category of data which may be received by the Input object 102, and is initially empty. The message register is a data register which receives and stores messages transmitted to the Input object 102. The data structure for the message register is shown in FIG. 6a, and the data structure for the table of actions is shown in FIG. 6b (these structures are described in greater detail below). The message register and the table of actions are grouped together into one data structure comprising the newly-created Input object 102 (block 214). The "Make an Input" function returns this compound data structure or its memory address (or other direct or indirect pointer) as the newly-created Input object 102 (block 216). In the preferred embodiment, the "Make an Input" function may be called using a command structure as follows:

MakeInput (input object name)

After Input objects 102 and Output objects 104 have been created for each respective logical input and output, actions are added to the Input objects 102 by means of library function called "Add an Action". Three parameters are specified by the programmer when calling the "Add an Action" function, and the function gets from the parameter list: (1) the name of the Input object 102 to which an action is to be added (block 222) ("name" as used herein signifies a name which can be automatically associated, in known fashion, to a memory address, or the memory address itself, or any other direct or indirect pointer from which the location of the object can be derived); (2) the data type for which the action will be taken (block 224); and (3) the name (or memory address or other pointer) of the subroutine which performs the desired action (block 226). The "Add an Action" function adds a data structure to the table of actions in the named Input object 102, consisting of the specified data type and the name of the associated action (block 228). In the preferred embodiment, the "Add an Action" function may be called using a command structure as follows:

AddAction (input object name, data type, subroutine name)

During operation, when the specified data type arrives at the specified Input object 102, the processor accesses and executes the specified action. If any other data type arrives at the specified Input object 102, the specified action will not take place. (If desired, the system can be designed such that a default action is executed by the processor if an unrecognized data type is received by an Input object 102). The "Add an Action" library function may be called repeatedly for a particular Input object 102 to specify additional data types and corresponding actions. For each action which is added by this library function, a data structure consisting of the data type and the associated action is added to the table of actions in the named Input object 102 (block 228).

Figure 4:
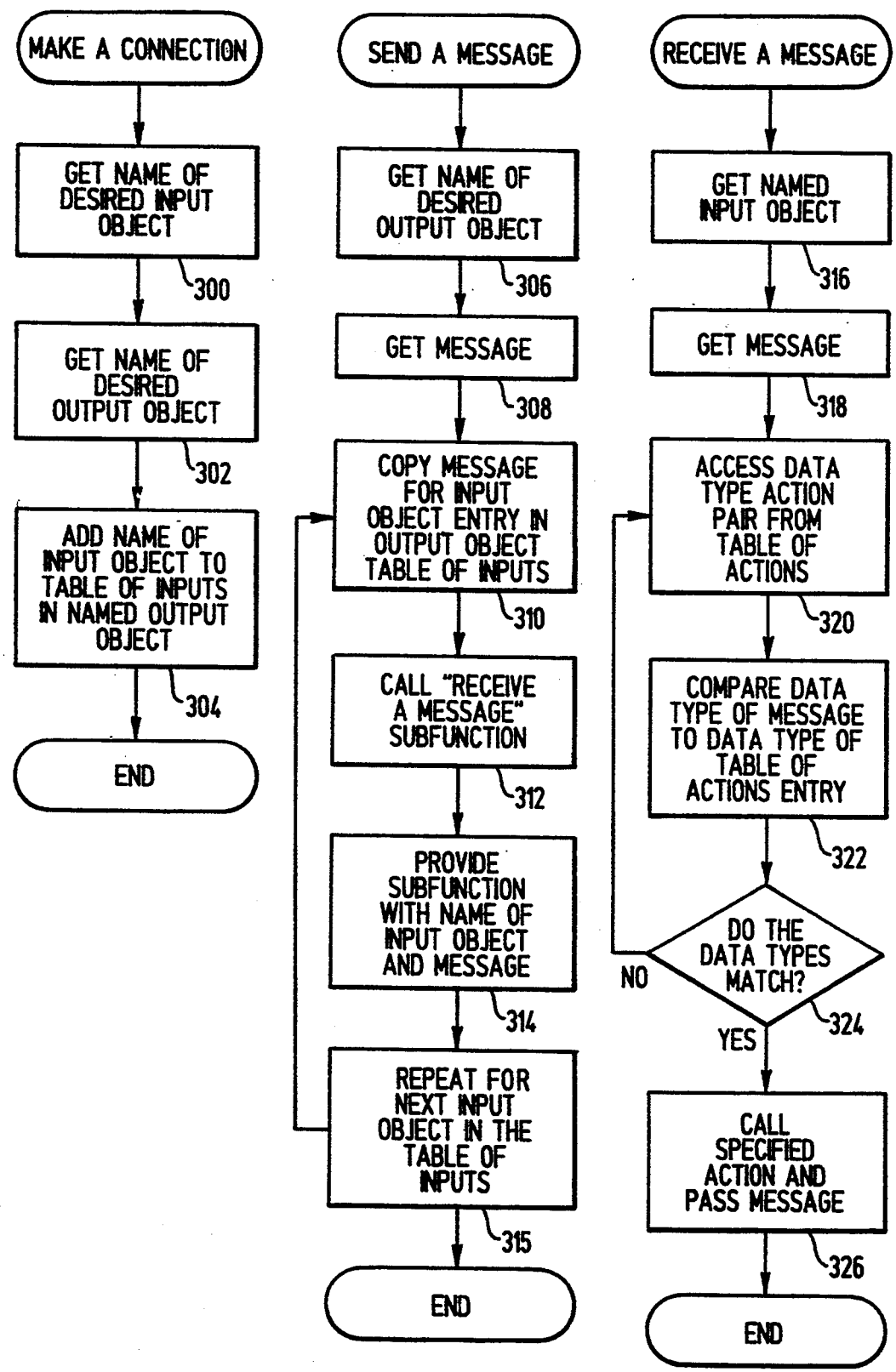
FIG. 4 is a high-level flowchart illustrating the preferred procedure for making a connection between two software modules, the preferred procedure for sending a message from an Output to an Input, and the preferred procedure for implementing the step of receiving a message.

After desired actions have been added to the Input objects 102, connections may be made between various individual software modules, as shown in FIG. 4. In one embodiment of the invention, connections are implemented by means of a "Make a Connection" library function. Two parameters are specified by the programmer when calling the "Make a Connection" function, and the function gets from the parameter list: (1) the name of the Input object 102 which is being connected (block 300); and (2) the name of the Output object 104 which is being connected (block 302). (Again, "name" here signifies a name or memory address or other pointer from which the location of the object can be derived). If a data type register is provided for an Output object 104, a comparison is made between the data types of the input table of actions of the Input object 102 and the data type in the data type register of the Output object 104. If the data types match or are compatible, the "Make a Connection" function adds the name of the specified Input object 102 to the table of inputs of the specified Output object 104, thus establishing a connection between the Output object 104 and the Input object 102 (block 304). If no match exists, an error message is returned.

The "Make a Connection" function may be called repeatedly to make all desired connections between selected Input objects 102 and Output objects 104. In the preferred embodiment, the "Make an Connection" function may be called using a command structure as follows:
MakeConnection (input object name, output object name)

The invention also includes a library function called "Send a Message". Two parameters are specified by the programmer when calling the "Send a Message" function, and the function gets from the parameter list: (1) the name of the Output object 104 which is to handle the message (block 306), and (2) the contents of the message (block 308). The message is a data structure which includes the data type and an associated value. The data value of the message is set by an associated software module. In the preferred embodiment, the "Send a Message" function may be called using a command structure as follows:
SendMessage (output object name, message)

The "Send a Message" function accesses the table of inputs in the named Output object 104. For each entry of the table of inputs, a copy of the message is created (block 310). Next, the "Send a Message" function calls a sub-function called "Receive a Message" (block 312). The "Send a Message" function passes to the "Receive a Message" function the name (or memory address or other pointer) of the current Input object 102 listed in the table of inputs of the named Output object 104, as well as the contents of the message (block 314). The process is repeated for every Input object 102 listed in the table of inputs of the named Output object 104 until done (block 315). Since each Input object 102 may be part of a different software module executed by the same processor or by a different processor, the address ultimately derived must point, directly or indirectly, to the location of the specified Input object 102.

The "Receive a Message" function gets two parameters passed by the "Send a Message" function: (1) the name of an Input object 102 which should receive the message (block 316), and (2) the message itself (block 318). After obtaining or deriving the address of the specified Input object 102 from the table of inputs of the originating Output object 104, in known fashion, the "Receive a Message" function accesses the paired data type-action entries in the table of actions of the specified Input object 102 (block 320). In the preferred embodiment, the "Receive a Message" function may be called using a command structure as follows:
ReceiveMessage (input object name, message)

For each entry of the table of actions, the "Receive a Message" function compares the data type of the message to the data type listed for the table of actions entry (block 322). If the data types do not match (block 324), the function goes on to the next pair in the table of actions (block 320).

If there is a match of data types (block 324), the "Receive a Message" function calls the action which is associated with that data type in the table of actions, and passes the message to the called action (block 326). Whether or not an action is specified, the message is placed into the message register of the Input object 102.

In one embodiment of the invention, after an action is complete, a next paired data type-action entry in the table of actions is accessed and processed in like manner, since an Input object 102 may have multiple responses to the same input data type and message.

FIG. 5 sets forth the data structure employed to build the table of inputs 500 for each Output object 104. The table of inputs 500 is initially created as the first step of creating an Output object 104 (block 202, FIG. 3). Each entry of the table of inputs 500 includes an Input Object Name 502 which specifies the name (or memory address or other pointer) of the Input object 102 to which the Output object 104 is connected.

In the preferred embodiment of the invention, each Input object 102 is uniquely named and distinct from all other Input objects 102. Thus, one particular Input object 102 might be referred to as "SLIDER1_IN". This identifier can then be used to specify this Input object 102 in making connections.

Similarly, in the preferred embodiment of the invention, each Output object 104 is uniquely named and distinct from all other Output objects 104. The name of each Output object 104 can then be used to specify the Output object 104 in making connections. However, in implementation, the collection of Output objects 104 for a particular software module may be constructed as part of a larger table, where each entry includes a name or number distinguishing the entries of one Output object 104 from the entries of all other Output objects 104. Such a "super" table is shown in FIG. 5, with an Output Number 504 distinguishing different Output objects 104.

FIG. 6a illustrates the data structure for the message register 610 created for each Input object 102 (block 212, FIG. 3). In the preferred embodiment of the invention, each message register 610 has an address defining its location in the computer system, and each entry includes a Data Type field 612 and Message Value field 614.

The Data Type field 612 specifies the data type of the message. Data types may include floating-point numbers, integers, binary numbers, ASCII characters, arrays, and/or a wide variety of simple or complex programmer-defined data structures (e.g., a compound structure incorporating an array of floating-point numbers and strings of ASCII data).

The Message Value field 614 contains a "value" corresponding to its associated data type. For example, if the Data Type is "FloatingPoint", the Message Value might be "440", which might be the value of a slider control on a music control device, such as a synthesizer.

In the preferred embodiment of the invention, each message register 610 is unique and distinct from all other message registers. However, in implementation, the collection of message registers 610 for a particular software module may be constructed as part of a larger table, where each entry includes a name or number distinguishing the entries of one message register 610 from the entries of all other message registers 610. Such a "super" table is shown in FIG. 6a, with a Register Number 616 distinguishing different message registers 610.

FIG. 6b sets forth the data structure for the table of actions 600 for each Input object 102. Each table of actions is created by the "Create an Input" function (block 210, FIG. 3). Each entry comprises a Data Type 602 and an Action 604. The Data Type 602 specifies the data type of each Action 604. The Action 604 specifies the function to be executed when the Input object 102 receives an input message having a matching data type. The action specified can be a mathematical operation, a data transfer operation, a transformation from the frequency to the time domain, a transformation from the time to the frequency domain, and/or the implementation of any other algorithm.

In the preferred embodiment of the invention, each table of actions 600 is unique and distinct from all other tables of actions 600. However, in implementation, the collection of tables of actions 600 for a particular software module may be constructed as part of a larger table, where each entry includes a name or number distinguishing the entries of one table of actions 600 from the entries of all other tables of actions 600. Such a "super" table is shown in FIG. 6b, with an Input Object Number 606 distinguishing different tables of actions 600.

A function may be provided for the direct interrogation of the table of actions 600 of an Input object 102, so that the data types supported by the Input object 102 can be determined. The function would simply access and display the table of actions 600 for a designated Input object 102. Similarly, the table of inputs of each Output object 104 can be directly queried to discover the Input objects 102 to which the Output object 104 is connected. If a data type register is provided in an Output object 104, the register can be directly queried to discover the data type of the Output object 104.

Examination of the table of actions 600 discloses that the table contains a collection of Data Types 602 for each Input object 102. These Data Types 602 represent the only data types accepted by a particular Input object 102. For example, Input object number 2 accepts floating-point, integer, and ASCII code data types. However, Input object number 2 will not accept 32-bit words. When messages are sent from an Output object 104, the data type of the message being transmitted is checked against the table of actions 600 of each Input object 102 listed in the table of inputs of the Output object 104. Only data type matches cause an Action to be executed (unless a default action is designated if no match occurs).

If desired, an error is reported if a data type is not present or cannot be "coerced". "Coercion" (also known in the art as "type casting") is a function which converts data from one type to another type. For example, it is relatively straightforward to convert a 16-bit integer into a 32-bit integer. However, other types of conversions may cause problems. Converting a floating-point number into an integer can result in a loss of precision. Accordingly, the coercion function is provided with a sub-function which will warn the user whenever such a coercion is made. If it is not possible to convert between particular types of data, any connection the user attempts to make will be refused, and an error message will be provided. However, the invention can be implemented to overcome most real-world situations where data types are not directly compatible. For example, the invention can be utilized in conjunction with a synthesizer's control input because the synthesizer's MIDI-formatted data can be easily converted into other commonly-utilized control formats, such as Yamaha Corporation's ESEQ data format.

In the preferred embodiment, if there are no entries in a particular table of actions 600 of an Input object 102, the Input object 102 is said to be in a demand-driven mode. In this mode, the Input object 102 will accept data into its message register 610, and then wait until the data is read by an associated software module. The data will be read, for example, when the user or another software module requests an output from the Input object's 102 associated software module. However, whenever there are entries in the table of actions 600 of an Input object 102, the Input object 102 is in a data-driven mode. The term "data-driven" signifies that, whenever data matching an entry Data Type 602 arrives, an associated Action 604 will be executed in the associated software module.

Because of the table structure of both the table of inputs in each Output object 104 and the table of actions in each Input object 102, as many Input objects 102 as desired can be connected to each Output object 104, and as many Output object 104 as desired can be connected to each Input object 102. In this manner, the invention supports arbitrary fan-in and fan-out. Furthermore, Input objects 102 and Output objects 104 may be situated in any software module and exist anywhere in the addressable space of a network of processors. Connections can be made between software objects within a single application, between different applications running on the same machine, and between applications running on different machines across a data network.

The functions described above and represented in FIGS. 2, 3, and 4 can be executed by an embedded processor in an electronic device such as a synthesizer, or by a general purpose computer, using known techniques of programming. The concepts of using, naming, and addressing objects, passing parameters, building and adding entries to tables, accessing and comparing values to table entries, and executing subroutines, are all well-known in the art. The software implementing the inventive functions, as well as particular application software modules, may be stored in ROM or loaded into RAM from a data storage device within such systems. The connections between system devices can be made using actual wires. Alternatively, the connections could be made as logical connections between devices on a network. The same type of data that is sent over the software connections described above (via passing of memory addresses) can also be sent over a corresponding hardware connection or logical network via known protocols and techniques. For example, connections could be made over a multi-user, multi-access Ethernet or FDDI network, using datagram or streaming communications techniques. In such a case, a programmer may have to provide a communications software module in each processor that handles the details of determining the address of all remote system devices. Such a communications software module preferably uses the present invention to create at least one Input object 102 and at least one Output object 104 to facilitate data transfers between other applications executing on the same processor as the communications software module.

When programs in all system hardware devices use the software invention, connection between devices is rendered much simpler. For example, if all the hardware devices of a music control system are on a network, connections between them can be made and broken under software control. No wires would have to be plugged and un-plugged, as with most presently-existing music control systems.

Example Implementation of Invention

The procedures and data structures described above in connection with FIGS. 2–6 will now be described in greater detail, with reference to specific examples. For instance, consider a software module designed to implement a musical waveform generator. Given a first floating-point number for frequency and a second floating-point number for amplitude, the module produces a musical waveform at that frequency and amplitude.

Referring to FIG. 2, the first step in creating Input objects 102 and Output objects 104 for the musical waveform generator software module is to identify the logical inputs and outputs of the module. In this example, the logical inputs are a floating-point number representing frequency and a floating-point number representing amplitude. The logical output is the musical waveform. Consequently, two Input objects 102 and one Output object 104 must be generated.

To make the musical waveform Output object 104, the "Create An Output" function (FIG. 3) is called by the programmer. Since the Output object 104 will produce a set of samples of the musical waveform, the data type passed to the "Create An Output" function will be type "samples". The "Create An Output" function creates an empty table of inputs (FIG. 3, block 202) and a data type register (block 204). The table of inputs will be filled in when the programmer or user specifies the connections to be made to the Output object 104. A data structure including the table of inputs (or the address of the table of inputs) and the data type register is returned as a newly-created WaveformOutput object 104.

To make the frequency Input object 102, the "Create An Input" function is called by the programmer. This function creates a table of actions (block 210, FIG. 3) and a message register (block 212). The table of actions lists the actions to take for each data type sent to the frequency Input object 102. In the present example, a floating-point number would cause the output frequency of the musical waveform generator to change. The message register functions as a holder for messages which arrive at the frequency Input object 102 of the waveform generator. These two data structures, the message register and the table of actions, are grouped together as one structure (block 214), which is returned (or the address of which is returned) as the FrequencyInput object 102 (block 216). This process is repeated for the amplitude input of the generator. In this case, the data structure is returned as the AmplitudeInput object 102.

After the FrequencyInput and AmplitudeInput objects 102 and the WaveformOutput object 104 for the generator are created, actions may be added to the Input objects 102, in the manner shown in FIG. 3. For example, assume that the programmer wishes to update a frequency readout which will display the operating frequency of the generator. Assume the programmer has already written a subroutine called "UpdateFrequency" to accomplish this purpose. Therefore, the programmer calls the "Add an Action" function with three parameters: the name of the Input object 102 to which the action is to be added to (i.e., the FrequencyInput object 102); the data type for triggering the action (i.e., floating-point); and the name or address of the subroutine which performs this action (the UpdateFrequency subroutine). These parameters are used to add a data type-action entry to the table of actions of the specified Input object 102 (blocks 222-228, FIG. 3). In this case, "floating-point" and "UpdateFrequency" (or an address or pointer) are added to the table of actions of the FrequencyInput object 102.

When a floating point number arrives at the FrequencyInput object 102, the UpdateFrequency subroutine will be invoked by the FrequencyInput object 102. If the FrequencyInput object 102 has no other entries in its table of actions, nothing will happen on the arrival of any other message data type at the object.

The connection of the musical waveform generator software module to another software module is accomplished by calling the "Make a Connection" function illustrated in FIG. 4. For example, suppose it is desired to connect the FrequencyInput object 102 of the waveform generator to a software module that mimics a sliding potentiometer (Slider). Assume that the programmer has written all required software modules. Further assume that all necessary software Input objects 102 and Output objects 104 have been created for the musical waveform generator and slider software modules, and actions have been added to the Input objects, using the functions shown in FIG. 3.

In this case, the "Make a Connection" function is provided with two parameters: the name or address of the FrequencyInput object 102 and the name or address of a SliderOutput object 104. The "Make a Connection" function can be called repeatedly to make all desired connections. For each connection, the specified Input object 102 is added to the table of inputs in the specified Output object 104, as shown in block 304 of FIG. 4. In this case, the name or address of the FrequencyInput object 102 is added to the table of inputs of the SliderOutput object 104.

If it is desired to send a message between, for example, the SliderOutput object 104 and the FrequencyInput object 102, the "Send a Message" function is called by the programmer or end-user. For instance, suppose that the system end-user clicks a computer mouse to move the position of a graphical slider created by the slider software module and shown on a display screen. The user moves the slider position indicator to a position representing the number 440, because the user wishes to produce a musical note having a frequency of 440 Hz (the "A" above middle "C"). The "Send a Message" function is called with two parameters: the name or address of the SliderOutput object 104, which will output the message, and the contents of the message. The function may be called using a command structure as follows:

SendMessage (SliderOutput, [floating point, 440])

The message is shown inside the square brackets, which mark the message as a data structure including the data type (floating point) and the value (440). When the "Send a Message" function is called, it accesses the table of inputs of the SliderOutput object 104. For each entry of the table of inputs, the function copies the message (block 310, FIG. 4) and calls the "Receive a Message" function (block 312).

The "Receive a Message" function accepts two parameters from the "Send a Message" function: the name of the Input object 102 which is going to receive the message (here, the FrequencyInput object 102), and the message itself. The "Receive a Message" function may be called using a command structure as follows:

ReceiveMessage (FrequencyInput, [floating point, 440]).

Again, the message is specified within the brackets. The "Receive a Message" function uses the name or address of the specified Input object 102 to access the table of actions for that object (block 320). For each entry of the table, the function checks to see if there is a match to the data type (i.e., floating-point) specified in the message (block 322). If there is a match, the function calls the action associated with that data type in the table of actions (block 326). In the present example, this action is the UpdateFrequency subroutine to change the frequency of the waveform generator. If there are no actions specified, the message will still be put into the FrequencyInput object's message register.

Graphical User Interface Embodiment

A further embodiment of the present invention relates to an improved graphical user interface. In the graphical user interface of the present invention, each graphic object (or "icon") on a display screen represents a software module 106, 108 (FIG. 1) running on some processor. By manipulating the icons, the user can affect the software modules 106, 108. Any software module 106, 108 which uses the above-described Input objects 102 or Output objects 104 to define its logical input and outputs can be connected to other, similar software modules 106, 108 on a graphics screen using "active plugs". Active plugs are graphical representations (icons) of a corresponding Input object 102 or Output object 104. Active plugs are a user interface mechanism that allow a user to graphically connect and graphically affect Input objects 102 and Output objects 104.

Figure 7B:
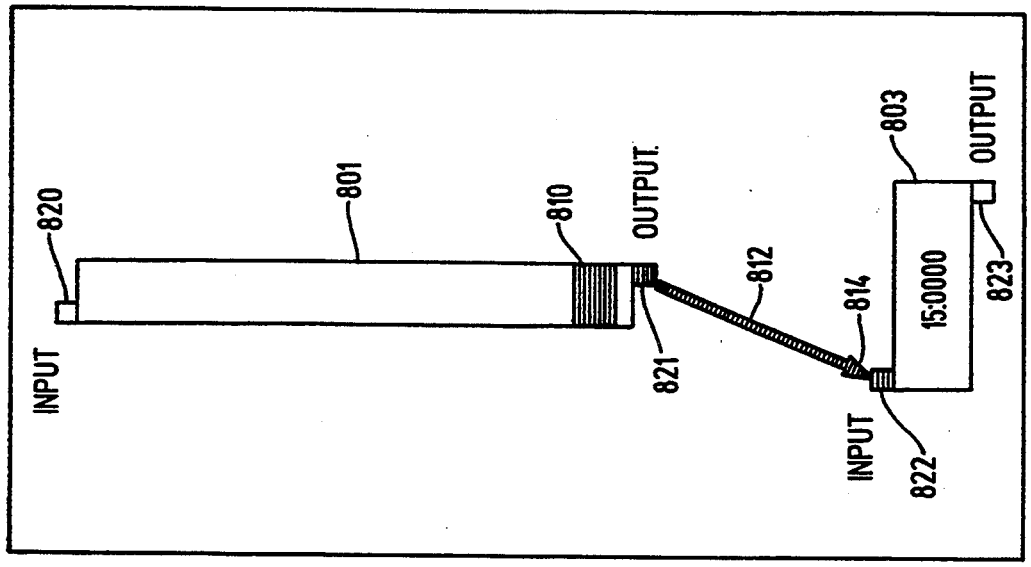
FIGS. 7a and 7b are graphical representations illustrating the graphical user interface of the present invention as applied to the process of making a connection between two software modules.
Figure 7A:
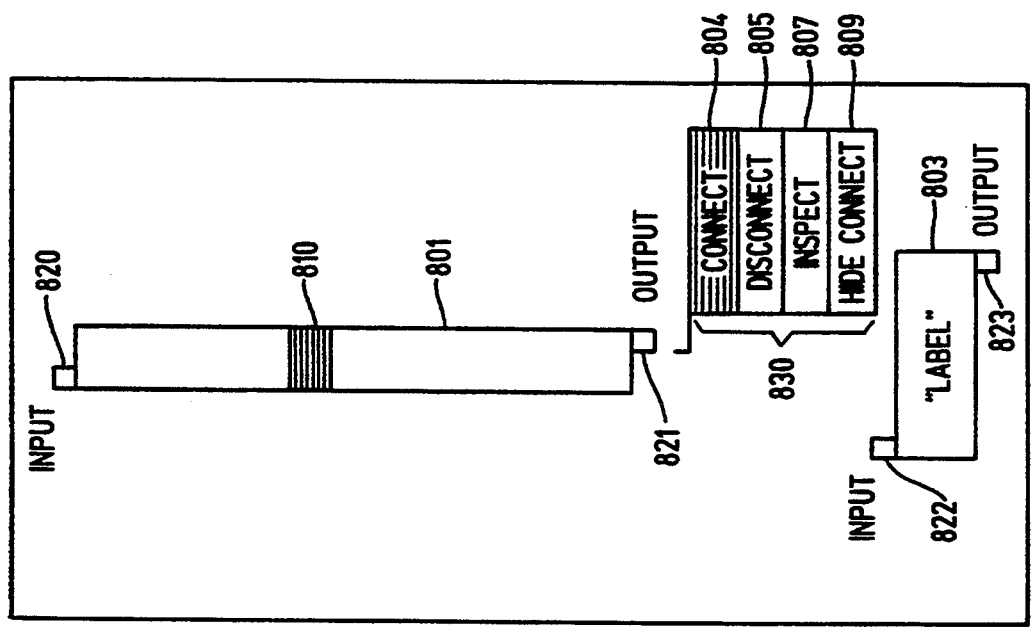

For example, referring to FIG. 7a, a "Slider" icon 801 represents a sliding potentiometer and corresponds to a software module that mimics a potentiometer. A "Label" 803 icon represents a digital display for displaying a numerical value and corresponds to a software module that provides the necessary program code to display such a value. The Slider icon 801 has a SliderInput active plug 820 and a SliderOutput active plug 821, which are graphical representations of a corresponding SliderInput object 102 and SliderOutput object 104, respectively. Similarly, the Label icon 803 has a LabelInput active plug 822 and a LabelOutput active plug 823.

Active plugs provide a visible user interface that permits a user to dynamically connect the software modules 106, 108 within an application. If the software modules 106, 108 are within several applications running on one or more computers, active plugs can connect the applications. The software modules 106, 108 can be running inside one window on the graphics screen, or in several windows. (See FIG. 9, 920, 930, and 940 for examples of such windows). This flexibility does not exist in any graphic user interface in the music control software industry at this time. The concept of active plugs is a major technical advance in the design of graphical user interfaces.

Referring again to FIG. 7a, active plugs are represented in the preferred embodiment by small squares at the top and bottom of the Slider icon 801 and the Label icon 803 (although other graphic objects could be used, such as plug icons and socket icons to represent output and input objects, respectively). If a software module cannot receive input, it will of course not use an Input object 102 software object. Accordingly, the icon for the software module will not contain an input active plug. Similarly, the icons for software modules that cannot send output will not have an output active plug. Software modules that have a number of different Input objects 102 (to control numerous parameters, for example) will have a corresponding number of input active plugs. In a similar manner, software modules having a plurality of Output objects 104 are provided with a corresponding plurality of output active plugs. In known fashion, an active plug icon would be associated with each software module icon if a corresponding Input object 102 or Output object 104 is contained within or linked to the software module.

In the preferred embodiment of the invention, connections between software modules can be graphically made, disconnected, inspected, and hidden by a user through simple operations on the active plugs associated with the icons representing the software modules. In the preferred embodiment, a user can access these operations by selecting items in a "pop-up" menu 830. The menu 830 appears when a computer system mouse button is pressed (or "clicked") while the display cursor is on an active plug 820-823. The menu 830 preferably provides selections for at least four functions: "Connect" 804 (corresponding to the "Make a Connection" function described above); "Disconnect" 805 (for disconnecting a presently existing connection); "Inspect" 807 (for inspecting information about a connection); and "Hide Connect" 809 (for hiding a connection).

In the example shown in FIG. 7a, a user has clicked on the SliderOutput active plug 821, causing the menu 830 to pop up. The Connect function 804 has been selected by a user, as indicated by highlighting the word "Connect". The user would then use the mouse to point to the LabelInput active plug 822 and again click the mouse button. In known fashion, the name (or address) of both the Slider Output object 104 associated with the SliderOutput active plug 821 and the Label Output object 104 associated with the LabelInput active plug 822 are fetched from the computer system. These names or addresses are then used as the parameters to the "Make a Connection" function described above, which operates as described.

In the preferred embodiment, the inventive graphical user interface displays a connection by drawing a line 812 (FIG. 7b), or "wire", between the connected output and input active plugs 821,822. Note that the small squares representing the active plugs are preferably filled in (blackened) when they have been used to make at least one connection, and the connection line 812 has an arrow-head 814 directed to the input active plug to indicate the direction of data flow.

In the preferred embodiment, connection lines 812 are displayed with different colors, intensities, line styles (e.g., solid, dashed, dotted, etc.), and/or thicknesses (or any other visual attribute) to indicate different aspects of the connection's state. On a color screen, all connections from a particular output can be displayed in the same hue. In the preferred embodiment, a solid line connecting an output active plug to an input active plug indicates that no data is actually flowing, but that the connection is made. A dashed line indicates that data is actually flowing. The rate of data flow can be graphically depicted by moving the dashed lines across the screen at a speed proportional to the rate of data flow, or by increasing the intensity of the line 812 proportional to the rate of data flow, or by any similar graphical or video technique.

The example in FIG. 7b shows that when the user moves the Slider icon's control bar 810 with a mouse or cursor keys, the Label icon 803 displays the current value ("15.0000") of the Slider icon 801. The dashed connection line 812 shows that data is actually being sent from the Output object 104 of the Slider software module to the Input object 102 of the Label software module. The information that a message has been sent can be obtained by noting each invocation of the "Receive a Message" function described above, and using that information to change the attributes of each connection line 812 over which a message is transmitted.

The Disconnect function 805 of the menu 830 provides an option for disconnecting an existing connection using the graphical user interface. For example, to disconnect the connection 812 shown in FIG. 7b, the user clicks on the SliderOutput active plug 821. This pops up the menu 830, from which the user selects the Disconnect function 805. The user then clicks on the LabelInput active plug 822. In known fashion, the name (or address) of both the Slider Output object 104 associated with the SliderOutput active plug 821 and the Label Output object 104 associated with the LabelInput active plug 822 are fetched from the computer system. These names or addresses are then used as parameters to a function similar to the "Make a Connection" described above, except that the input table of the designated Output object 104 (here, SliderOutput) is searched for an input object name or address matching the name or address of the designated Input object 102 (here, LabelInput), and the table entry is deleted or marked inaccessible. Further, the connection line 812 between the two software module icons is removed from the display, so that the output active plug 821 of the Slider icon 801 is no longer shown connected to the input active plug 822 of the Label icon 803.

A user can control whether the connections and plugs are to be displayed or hidden from view. When the user clicks on an active plug and selects the Hide Connect function 809 from the pop-up menu 830, the system suppresses display of the active plug icon and any lines 812 connecting that active plug icon to any other active plug icon. If a first active plug is connected to only one other active plug, and the other active plug is hidden, then the first active plug icon is also hidden. However, in the preferred embodiment, if the first active plug is coupled to any other non-hidden active plugs, then the first active plug icon will not be hidden. Programming techniques for suppressing selected objects on a display are well-known in the art.

In an alternative embodiment, an active plug icon will be suppressed any time any other connected active plug is hidden, In another alternative embodiment, a connection can be selected for hiding by "clicking" on the connection line itself, rather than on an active plug.

Figure 8:
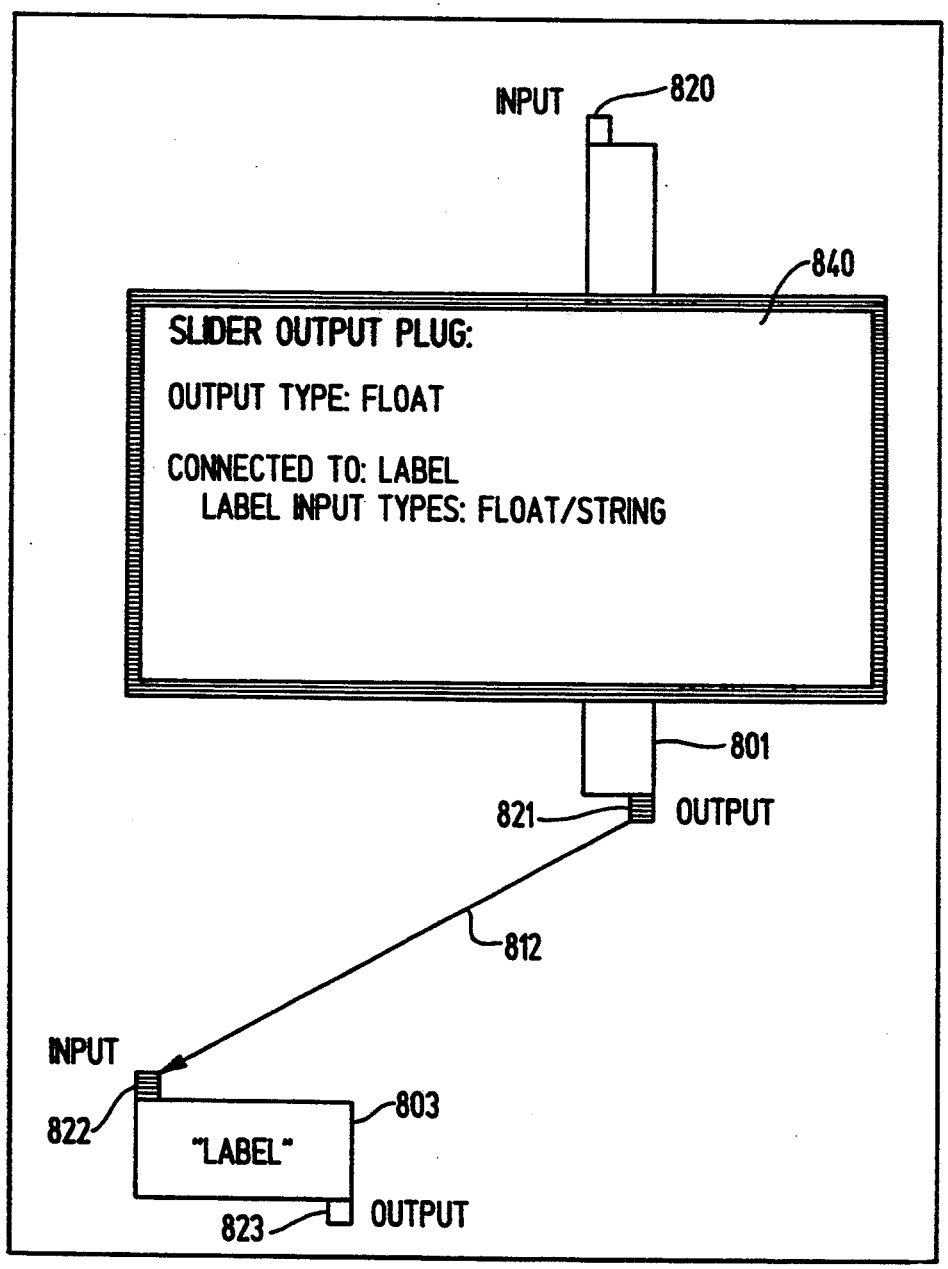
FIG. 8 is a graphical representation illustrating the process of inspecting a connection between the two software modules of FIGS. 7a and 7b by means of the graphical user interface of the present invention.

FIG. 8 is a graphical representation illustrating the process of inspecting a connection 812 between the icons representing two software modules 801,803. As in FIG. 7b, the Slider icon 801 is connected to the Label icon 803. To inspect the connection 812, the user clicks on the SliderOutput active plug 821 (or, alternatively, on the LabelInput 822). This pops up the menu 830, from which the user selects the Inspect function 807. In the preferred embodiment, the Inspect function provides the user with detailed information in the form of a window 840 setting forth various connection parameters.

For example, the window 840 preferably informs the user of: the name of the Output object 104 ("SliderOutput") which is hooked up to the inspected connection 812; the data type transmitted by the Output object 104 (e.g., "floating-point"); the names of the Input objects 102 (here, only "LabelInput") to which the Output object 104 is connected; and the data types that each Input object 102 has in its table of actions (in this example, floating point numbers or character strings). In this manner, a user can ascertain whether or not a connection 812 links together two modules with compatible data types.

Since each active plug display icon is associated with a specific, named Input object 102 or Output object 104, all of the information needed to display the Inspect function window can be obtained by accessing the underlying Input object 102 and Output object 104 linked by a connection, and examining the table of actions of the connected Input object 102. Accessing and displaying such information is straightforward in view of the structure of Input objects 102 and Output objects 104 described above.

Although a pop-up menu is the preferred method of selecting a command, the invention encompasses use of a keyboard or other input means for selecting a command. Further, while the above description suggests that an active plug is first selected, then a command is selected, then a second active plug is selected where appropriate, this order can be varied so that the first and second active plugs are selected, and then the command to be executed is selected.

Further Examples of the Invention

A more complete example of the graphical interface of the present invention is shown in FIG. 9. FIG. 9 shows how Input objects 102 and Output objects 104 can be connected across applications. A computer display screen 910 simultaneously displays activity occurring within a plurality of applications by displaying each application within its own window 920, 930, 940.

Each window 920, 930, 940 may be updated or modified, as necessary, independently of the other windows. For example, window 920 displays the current time and date. This window is continually updated to keep the displayed parameters current. An Amp Control Window 930 displays a sliding potentiometer ("slider") 941. The output active plug of the slider 941 is linked via a connection 945 (which may be a physical, dedicated wire or a network link) to the input active plug of an Edit Structure Window 940.

In this example, the Edit Structure Window 940 graphically displays a user-defined musical sequence as a plurality of sections 951,953, 955. Each section 951,953, 955 may be exploded to indicate individual musical notes on a staff, as shown at 959. In this example, the Edit Structure Window 940 has an amplitude input active plug 943 and an output active plug 942. After defining a musical sequence in the Edit Structure Window 940, a user can control the output amplitude of the music generated from that sequence by using the slider 941 in the Amp Control window 930.

Figure 10A:
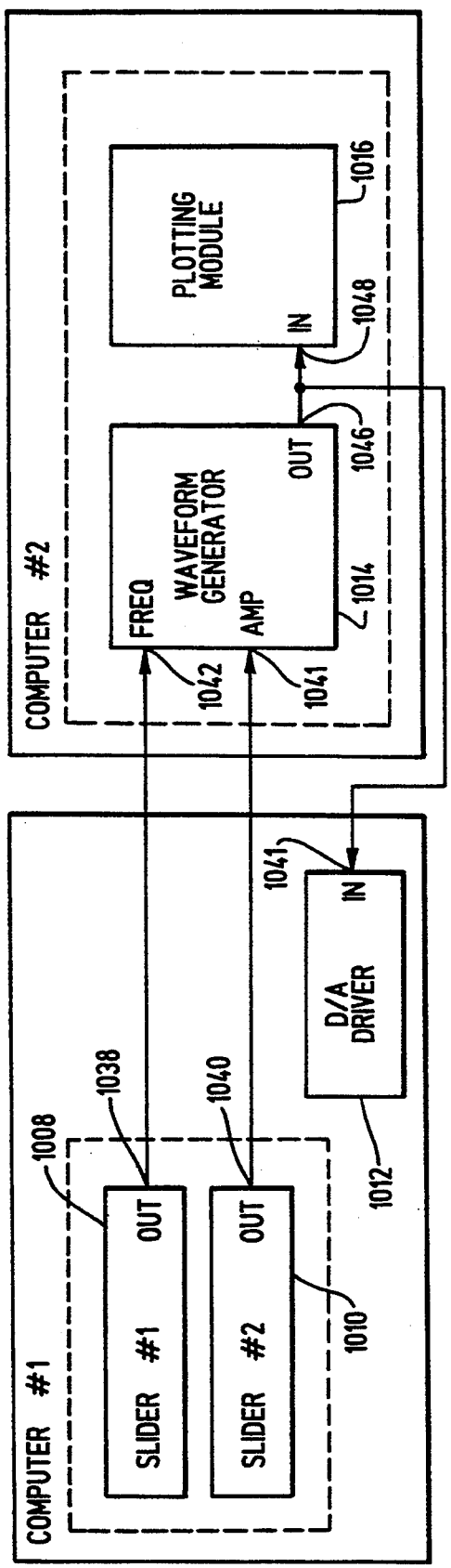
FIG. 10a is a block diagram illustrating the operational environment of the present invention in the context of a computer-aided system for musical composition.

FIG. 10a is a block diagram illustrating the operational environment of the present invention in the context of a computer-aided system for musical composition. The system employs a plurality of software modules engaged in communication between Input objects 102 and Output objects 104 (FIG. 1) created in accordance with the present invention. The configuration shown in FIG. 10a uses two computers, Computer #1 and Computer #2. Computer #1 may be, for example, a graphic oriented system, such as an Apple Corporation Macintosh computer or a Sun Corporation workstation. Using the present invention, such a system can be used to configure a complete electronic music recording studio.

The illustrated configuration includes two slider software modules 1008, 1010, both executed in Computer #1, which implement the slider functionality. A software programmer would use the processes described in FIGS. 2, 3, and 4 to create an Output object 1038, 1040 for each of the sliders 1008, 1010. Computer #1 also includes a software module for implementing a digital-to-analog (D/A) driver 1012 with its own Input object 1041.

Figure 10B:
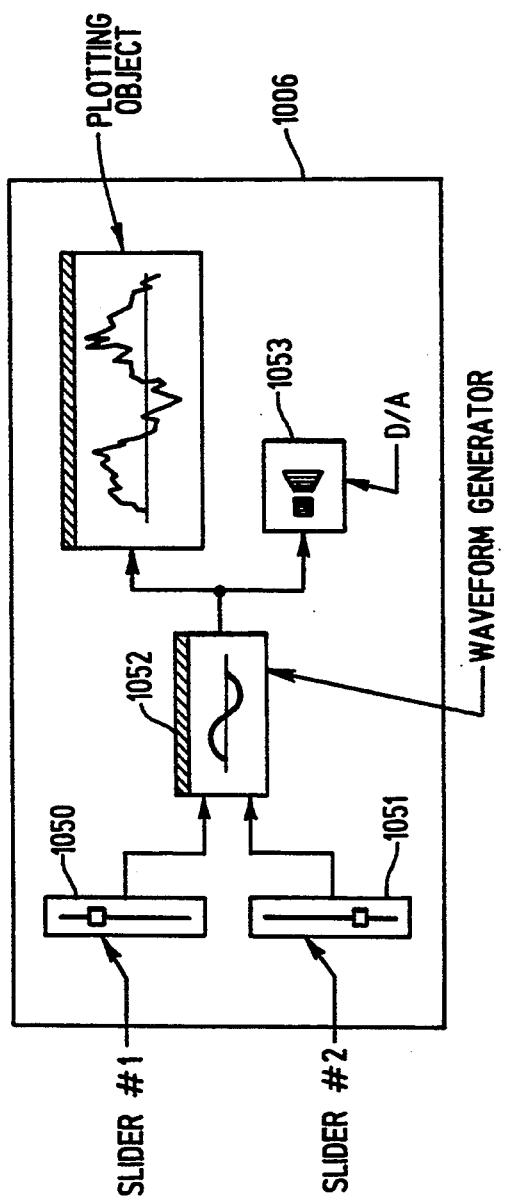

The display screen 1006 of Computer #1 is shown in FIG. 10b. In the preferred embodiment, each software module has a graphic icon associated with it. If Computer #1 is selected by the user to be the "master" control computer, a description of each software module icon is sent to Computer #1. The system software running on Computer #1 would show the icons, in known fashion. Connections established through use of the present invention would also be displayed on Computer #1.

In this case, the slider software modules 1008, 1010 represent software modules for a user-interface application. The slider software modules 1008, 1010 handle generating a floating-point numeric output and updating the slider icons 1050, 1051 on the display screen 1006. The D/A driver software module 1012 may also cause an icon 1053 to be displayed, but the principal function of such a module would be to actually control digital-to-analog conversion circuitry for generating an analog sound waveform from a digital input. The analog sound waveform may be amplified and output over a speaker, or recorded on an analog medium.

In this example, a waveform generator 1014 and a plotting module 1016 are software modules executing as independent applications in computer #2. This computer could be, for example, an embedded computer inside an electronic music synthesizer which has a small display. The waveform generator 1014 has a frequency Input object 1042, an amplitude Input object 1044, and an Output object 1046. The waveform generator 1014 is graphically represented on the display 1006 as a sine wave icon 1052.

The waveform generator 1014 calculates sine wave samples based upon floating-point data values received at its frequency Input object 1042 and its amplitude Input object 1044. In this case, the waveform generator 1014 operates in a "data-driven" mode. That is, when either Input object 1042, 1044 of the waveform generator 1014 receives a floating point number from any source, the waveform generator 1014 calculates the appropriate output frequency and amplitude, and sends this output to the waveform generator 1014 Output object 1046. The waveform generator 1014 is connected to the D/A driver 1012, which converts the digital waveform produced by the waveform generator 1014 into an analog waveform capable of driving a conventional loudspeaker or analog audio amplifier.

The plotting module 1016 has one Input object 1048. A connection is also made between the waveform generator Output object 1046 and the plotting module Input object 1048, using the methods of the present invention. The plotting module 1016 uses data received at its input object 1048 to plot a waveform as a function of amplitude versus time. The waveform is output to the system for display on Computer #1, as shown in FIG. 10b.

A software programmer would use the process of the present invention as described in FIGS. 2, 3, and 4 to create the Input objects and Output objects for the software modules shown in FIG. 10a. In this manner, the software modules may be connected as desired by a user by means of Input objects and Output objects. The connection feature is still operational in spite of the fact that some software modules reside in Computer #1 and other software modules reside on Computer #2.

In the illustrated example, the modules of FIG. 10a are configured such that the Output object 1038 of a first slider 1008 is connected to the frequency Input object 1042 of the waveform generator 1014, and the Output object 1040 of a second slider 1010 is connected to the amplitude Input object 1044 of the waveform generator 1014. In this manner, the position of the first slider 1008 determines the frequency and the position of the second slider 1010 determines the amplitude of the of data transmitted from the Output object 1046 of the waveform generator 1014.

Note that some of the connections shown in FIG. 10a may be implemented in hardware, others may be implemented using a combination of software and hardware, and still others may be implemented only in software. For example, the waveform generator 1014 Output object 1046 and the plotter module 1016 Input object 1048 would normally communicate by passing data in a memory location in computer #2. However, the connections between the two computers are made over some kind of physical connection. This can be a serial cable, a network, an RF data communications system, or any other type of hardware communication system. The invention hides all of these details of implementation from the individual software modules. All inter-module communication knowledge is abstracted out from the software modules. Each software module merely responds to data received by its Input objects and sends data to its Output objects. Thus, connections can be made, broken, and changed between software modules without changing the code in the software modules.

For example, when the icon 1050 of the first slider 1008 is moved on the screen by a user, the slider software module 1008 represented by the slider icon 1050 sends the slider Output object 1038 a floating-point number representing the slider's current value. That value is transmitted by the slider Output object 1038 to the frequency Input object 1042 of the waveform generator 1014 without further involvement of the first slider software module 1008. Thus, the first slider software module 1008 has no "knowledge" of where the floating-point number representing the slider output goes after calling the "Send a Message" function. The slider Output object 1038, generated by calling the "Make an Output" and "Make a Connection" functions, takes care of the details of transmitting the slider software module floating-point data. Similarly, the frequency Input object 1042, generated by calling the "Make an Input" and "Add an Action" functions, takes care of the details of receiving floating-point data and invoking an action within the waveform generator 1014 in response to such data. The waveform generator 1014 never "knows" where the data originates.

The above description describes a software implementation of the invention adapted to run on embedded processors in hardware devices (e.g., signal processors, mixers, synthesizers, etc.). This type of implementation is useful in itself. In this context, the invention provides a uniform method of connecting together all hardware devices. Data sent between drives is typed, and causes actions to happen inside receiving devices based on a table of actions. In this kind of implementation, the device's physical inputs and outputs will correspond to the Input objects 102 and Output objects 104 described above (there will also be software modules inside such hardware devices which directly connect through Input objects 102 and Output objects 104 without passing through a hardware Interface). Physical connections between the devices can be made by means of plugable wires (e.g., MIDI cables) which can be changed by means of the simply unplugging and plugging the cables as desired. However, if the devices are all on a network, the connections would be made logically through software alone. It is very likely that the music studio of the future will have all of the various musical devices and associated processing equipment connected via such a network.

Figure 11:
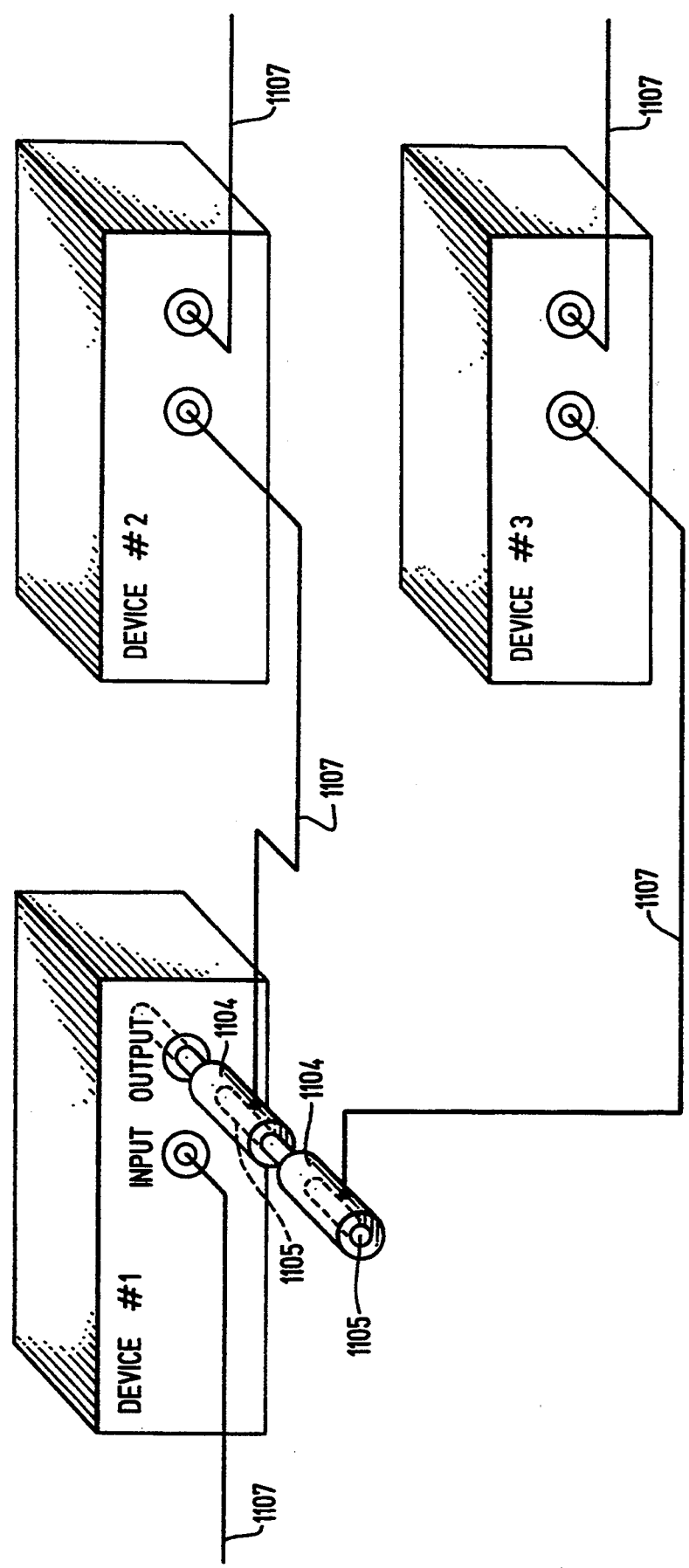
FIG. 11 is a diagrammatic representation of an alternative hardware implementation of the present invention.

FIG. 11 is a diagrammatic representation of an alternative hardware implementation of the present invention, showing typical connections between a plurality of independent hardware modules. The hardware connection scheme of FIG. 11 includes three hardware devices: device #1, device #2, and device #3. In the field of computer-aided musical composition, by way of example only, device #1 could be a variable-frequency signal generator, device #2 could be a synthesizer, and device #3 could be an analog or digital delay line. Each input port and each output port of each device includes a jack, and corresponds to an Input object 102 or an Output object 104, as described above. That is, each port has a hardware interface for sending or receiving signals to external devices, and internally is controlled by a software module that interfaces to the port through one or more Input objects 102 or Output objects 104.

Devices #1, #2, and #3 are interconnected as shown by means of connector plugs 1104 and cables 1107. All hardware devices use the same types of cables 1107.

Note that in the preferred embodiment, the connector plugs 1104 each contain sockets 1105 for the reception, or "nesting", of additional plugs 1104. Using such plugs, a single device output can be coupled to a number of device inputs (limited only by the electrical requirements of driving a number of signal cables 1107). For input, fan-in is more difficult than fan-out, and would require a signal merging device (similar to a MIDI merger device) that essentially performs a logical OR function.

In a typical system, the cables 1107 would carry the exact same data carried between the software versions of the Input object 102 and Output object 104 (FIG. 1) inventions. Furthermore, all devices carry data in the same format (e.g., a standardized packet with ID, DATA, and ECC fields). In a more complex embodiment, the hardware input and output ports could be employed to convert data from one type of electrical signal to another (e.g., an RS-232 serial format to an internal parallel format).

In this manner, a number of devices can be interconnected in an appropriate manner to form a desired configuration of the system. In this context, the term "appropriate" means that a particular cable 1107 should only be connected between devices capable of transferring similar data types. If inappropriate connections are made (i.e., the Output object 104 and Input object 102 data types are not compatible), the system designer will receive an error message. However, the designer is not constrained to working with a fixed number of inputs and outputs for each of the devices, due to the unique design of the plug 1104 and the underlying software data structures shown in FIGS. 5 and 6.

All of the features of the Input objects 102 and Output objects 104 may be implemented in any computer language. In the preferred embodiment of the invention, the functions of the invention are written in the C++ language. C++ is an object-oriented language which provides a number of useful features. The Input object 102 and Output object 104 structures are preferably C++ classes, which encapsulate the data and functionality associated with these classes. This encapsulation serves to insulate the end-user from trivial, tedious, or unnecessary details. As a side benefit, such encapsulation also protects the system's data structures from user tampering.

The C++ language provides a higher-level interface to the features of the Input objects 102 and Output objects 104 than most other commonly-utilized languages. C++ also supports an inheritance feature. Inheritability provides an advantage in that any software module which needs to use the Input object 102 or Output object 104 features is sub-classed from the C++ class encapsulating these lower-level classes. This immediately gives the module access to all system functionality. The graphical user interface of the present invention has also been implemented using the C++ language. The interface program runs under commonly-available window systems, such as the X-Window System available from the Massachusetts Institute of Technology.

A number of embodiments of the present invention have been described. Nevertheless, it will be understood that various modifications may be made without departing from the spirit and scope of the invention.

For example, the tables described above may be implemented in any known way of constructing a database table, including sequential, relational, and hierarchical structures. Further, although the invention has been described in the context of systems for computer-aided musical composition, this approach was followed for illustrative purposes only. It is to be understood that the invention may be employed in any application which uses a plurality of software modules. Accordingly, it is to be understood that the invention is not to be limited by the specific illustrated embodiment, but only by the scope of the appended claims.

What is claimed is:

1. A machine-implemented method for linking together a plurality of software modules using linkable objects, each module having at least one of (a) at least one data input and (b) at least one data output, comprising the steps of:
   (1) identifying the data inputs and the data outputs for each software module wherein each of the data inputs and data outputs includes data of at least one data type;
   (2) categorizing each of the data inputs and data outputs according to its respective data types; and
   (3) creating an Input object, Output object, or both, for each software module using the data inputs and data outputs identified in the identifying step and the data type categorization from the categorizing step wherein the Input and Output objects are linkable;
   further comprising:
   designating an Input object identifier for each Input object; and
   wherein the step of creating an Input object, Output object, or both includes the steps of:
   (1) creating each Output object by generating a table of inputs containing one or more input entries, each input entry for receiving a designated Input object identifier;
   (2) creating each Input object by generating:
      (a) a table of actions containing one or more action entries, each action entry for receiving data of a designated data type and corresponding action identifier, and
      (b) a message register for receiving data values from an Output object;
   (3) adding action entries of at least one designated Input object to the table of actions;
   (4) making a connection between at least two software modules by adding an Input object identifier for a first software module to the table of inputs of an Output object of a second software module; and
   (5) transferring data between a designated output object and at least one connected Input object by:
      (a) specifying a message comprising a data type indicator and a corresponding data value, and
      (b) sending a copy of the message to each connected Input object identified in the table of inputs of the designated Output object.

2. A method for linking together a plurality of software modules in accordance with claim 1, wherein the step of transferring data further includes the steps of:
   (1) storing the data value contained in the message in the message register of each connected Input object;
   (2) identifying matching action entries in the table of actions of each connected Input object wherein the matching action entries have designated data types which match the data type indicator of the message; and
   (3) executing an action indicated by the matching action entries.

3. A method for linking together a plurality of software modules in accordance with claim 1, further including the steps of:
   (1) associating a function icon with each software module;
   (2) associating an input icon with each Input object of each software module, and an output icon with each Output object of each software module; and
   (3) displaying each function icon, input icon, and output icon of the plurality of software modules on a display device.

4. A method for linking together a plurality of software modules in accordance with claim 3, further including:
   representing a connection between an Output object and an Input object on the display device with a graphical connector line between the output and input icons associated with the connected Output and Input objects wherein the line has a first visual attribute when no data is being transferred between the Output object and the Input object and a second visual attribute when data is being transferred between the Output object and the Input object.

5. A method for linking together a plurality of software modules in accordance with claim 4, wherein the graphical connection line is definable by the steps of:
   (1) indicating with a cursor-control device an output icon as a first end for the graphical connection line;
   (2) indicating with the cursor-control device an input icon as the second end for the graphical connection line; and
   (3) selecting a command to establish a connection between the Output object and Input object respectively represented by the output icon and the input icon;
   (4) displaying a line between the indicated output and input icons.

6. A method for linking together a plurality of software modules in accordance with claim 4, wherein the graphical connection line may be removed by the steps of:
   (1) indicating with a cursor-control device an output icon which is at one end of the graphical connection line;
   (2) indicating with the cursor-control device an input icon which is at a second end of the graphical connection line wherein the graphical connection line runs between the indicated output and input icons;
   (3) removing a connection between the Output and Input objects respectively represented by the indicated output and input icons; (4) removing the graphical connection line connecting the indicated output and input icons.

7. A method for linking together a plurality of software modules in accordance with claim 4, further comprising a step of hiding the graphical connection line by the steps of:
   (1) indicating with a cursor-control device an output icon as a first end of the graphical connection line;
   (2) indicating with the cursor-control device an input icon as the second end of the graphical connection line;
   (3) selecting a command to hide the connection line; and (4) suppressing display of the connection line.

8. A method for linking together a plurality of software modules in accordance with claim 4, wherein informational characteristics of a connection between an output icon and an input icon can be displayed by an end-user by the steps of:
 (1) indicating with a cursor-control device one of the output icon or input icon at an end of a graphical connection line between the output icon and input icon;
 (2) selecting a command to display information about the connection between the Output object and Input object respectively represented by the output icon and the input icon connected by the connection line;
 (3) accessing the Output object and the Input object;
 (4) displaying selected information about at least one of the Output object and the Input object.

9. A method for linking together a plurality of software modules in accordance with claim 1, wherein at least a first software module is located in a first processing device, and at least a second software module is located in a second processing device.

10. A method for linking together a plurality of software modules in accordance with claim 9, wherein the first processing device is connected to the second processing device by means of a dedicated signal carrier.

11. A method for linking together a plurality of software modules in accordance with claim 9, wherein the first processing device is connected to the second processing device by means of a multi-access network.

12. A machine-implemented method for communicating data between a plurality of software modules, each software module having at least one of at least one Input object and at least one Output object, wherein:
 (a) each Input object having a table of actions containing one or more action entries, each action entry comprising a designated data type and corresponding action identifier, and a message register for receiving data values from an Output object, and
 (b) each Output object having a table of inputs containing one or more input entries, each input entry comprising a designated Input object identifier, wherein at least one Output object is linked to at least one Input object, comprising the steps of:
  (1) transferring data between a designated Output object to at least one linked Input object by specifying (a) a message comprising a data type and a corresponding data value, and (b) sending a copy of the message to each Input object specified in the entries of the table of inputs of the designated Output object;
  (2) storing the data value in the message register of each such Input object;
  (3) comparing the data type of the message to the data type of each action entry in the table of actions of each such Input object; and
  (4) executing the action indicated by the action identifier corresponding to the matching action entry data type if the compared data types match.

13. A method for linking together a plurality of software modules in accordance with claim 12, wherein at least a first software module is located in a first processing device, and at least a second software module is located in a second processing device.

14. A method for linking together a plurality of software modules in accordance with claim 13, wherein the first processing device is connected to the second processing device by means of a dedicated signal carrier.

15. A method for linking together a plurality of software modules in accordance with claim 13, wherein the first processing device is connected to the second processing device by means of a multi-access network.

16. A computer apparatus for communicating data between a plurality of software modules, each software module having at least one of at least one Input object and at least one Output object, wherein:
 (a) each Input object having a table of actions containing one or more action entries, each action entry comprising a designated data type and corresponding action identifier, and a message register for receiving data values from an Output object, and
 (b) each Output object having a table of inputs containing one or more input entries, each input entry comprising a designated Input object identifier, wherein at least one Output object is linked to at least one Input object, the apparatus comprising:
  (1) means for transferring data between a designated Output object to at least one linked Input object by specifying (a) a message comprising a data type and a corresponding data value, and (b) sending a copy of the message to each Input object specified in the entries of the table of inputs of the designated Output object;
  (2) means for storing the data value in the message register of each such Input object;
  (3) means for comparing the data type of the message to the data type of each action entry in the table of actions of each such Input object; and
  (4) means for executing the action indicated by the action identifier corresponding to the matching action entry data type if the compared data types match.

17. An apparatus for communicating data between a plurality of software modules in accordance with claim 16, further comprising:
 (1) a plurality of hardware devices, each for performing at least one function, and each having at least one processor for executing at least one of the plurality of software modules, and each having at least one of (a) at least one input port corresponding to at least one Input object, and (b) at least one output port corresponding to at least one Output object; and
 (2) at least one communication linkage between at least one output port of a first hardware device and at least one input port of a second hardware device.

18. An apparatus for communicating data between a plurality of software modules in accordance with claim 17, wherein each communication linkage is a dedicated signal carrier.

19. An apparatus for communicating data between a plurality of software modules in accordance with claim 17, wherein each communication linkage is a multi-access network.

20. An apparatus for communicating data between a plurality of software modules in accordance with claim 17, wherein the hardware devices are components of a music generation and control system.

* * * * *